Feb. 20, 1923.

J. W. AKARD.
DEMOUNTABLE TIRE RIM.
FILED JUNE 13, 1921.

J. W. Akard
INVENTOR.

BY
Cushman, Bryant & Darby
ATTORNEYS

Feb. 20, 1923.
J. W. AKARD.
DEMOUNTABLE TIRE RIM.
FILED JUNE 13, 1921.
1,445,926.
2 SHEETS—SHEET 2.
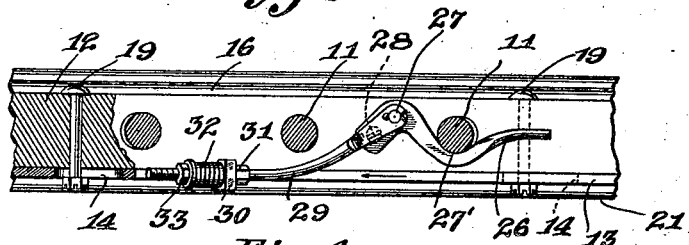
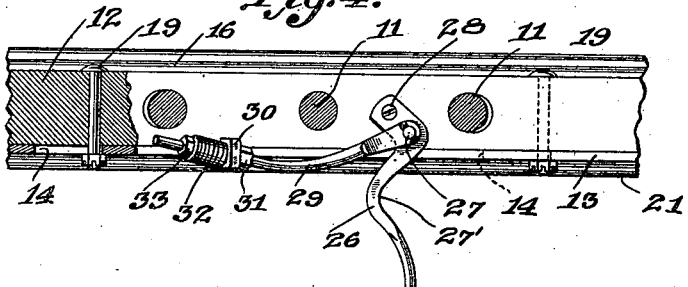
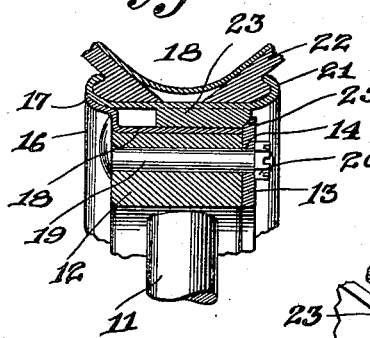
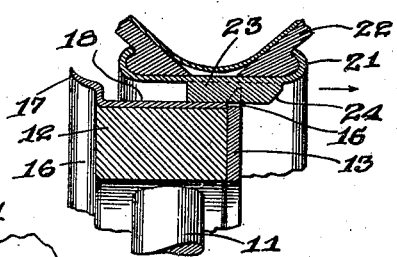
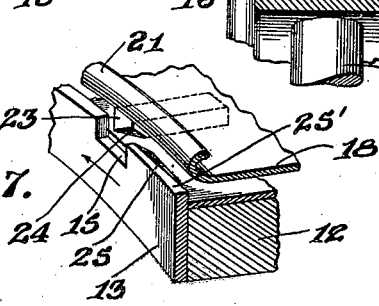
J. W. Akard
INVENTOR.
BY
Cushman, Bryant & Darby
ATTORNEYS Patented Feb. 20, 1923.

1,445,926

UNITED STATES PATENT OFFICE.

JOHN WILLIAM AKARD, OF FAIR PLAY, MISSOURI.

DEMOUNTABLE TIRE RIM.

Application filed June 13, 1921. Serial No. 477,131.

*To all whom it may concern:*

Be it known that I, JOHN WILLIAM AKARD, a citizen of the United States, residing at Fair Play, in the county of Polk and State of Missouri, have invented new and useful Improvements in Demountable Tire Rims, of which the following is a specification.

The present invention relates to improvements in demountable tire rims and has for its object the employing of a shifting and locking device whereby the rim may be quickly attached to or removed from the wheel without the use of tools of any kind.

A further object of the invention is the employing of a toggle locking lever which is provided with means for securely holding the lever in an unobstructed position when the latter is not in operation.

In the drawings:—

Fig. 3 is a horizontal sectional view taken on the line 3—3 of Fig. 1;

Fig. 4 is a horizontal sectional view taken on the line 4—4 of Fig. 2;

Fig. 5 is a transverse sectional view taken on the line 5—5 of Fig. 1;

Fig. 6 is a transverse sectional view taken on the line 6—6 of Fig. 2, showing the demountable rim being released from the wheel;

Fig. 7 is a fragmentary perspective view disclosing more particularly the operation of the locking ring.

Figure 1:
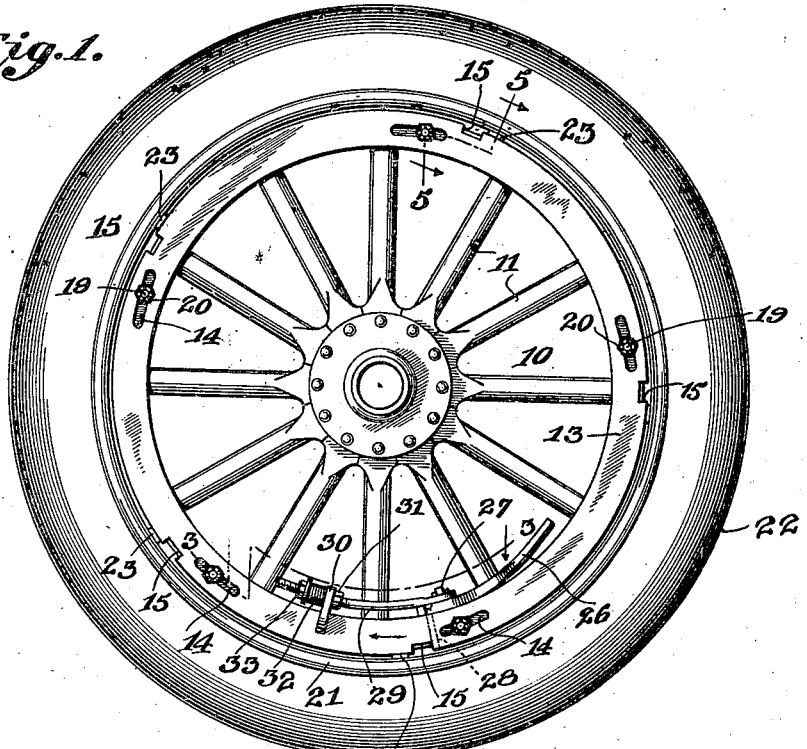
Fig. 1 is a side elevation of a wheel embodying my improvements and viewed from the outer side thereof.

Referring to the drawings, like numerals representing like parts in the corresponding figures, the wheel 10 is provided with the usual spokes 11 and felly 12. To the outer side of the felly is attached a shiftable ring 13 having arranged therein a plurality of elongated slots 14 and peripheral recesses 15. A complementary rim 16 having an upstanding flange 17 and a transverse portion 18, one edge of which abuts against the inner face of the shiftable ring 13, is held in position by means of the bolts 19 which extend through the felly and slots 14 in the ring 13. The nuts 20, threaded to the bolts 19, permit a rotative movement to be imparted to the ring when the latter is actuated by means hereinafter described.

The rim 21, which receives the usual shoe 22, has arranged on its inner face a plurality of spaced lugs 23, which may be either welded to or formed integral with the rim. These lugs adjacent their forward ends are beveled in two directions, as indicated at 24 (Figs. 2, 6 and 7) both transversely and circumferentially of the rim to form a wedge. The ring 13 adjacent each recess 15 is beveled on its inner face at 25, where it engages the beveled faces of the lugs 23 when the ring 13 is rotated in an anti-clockwise direction. As will be observed from an inspection of Fig. 7, the ring is beveled so that its width along its outer edge 25' gradually decreases in the direction of the recesses 15, beginning a short distance from each recess.

Figure 2:
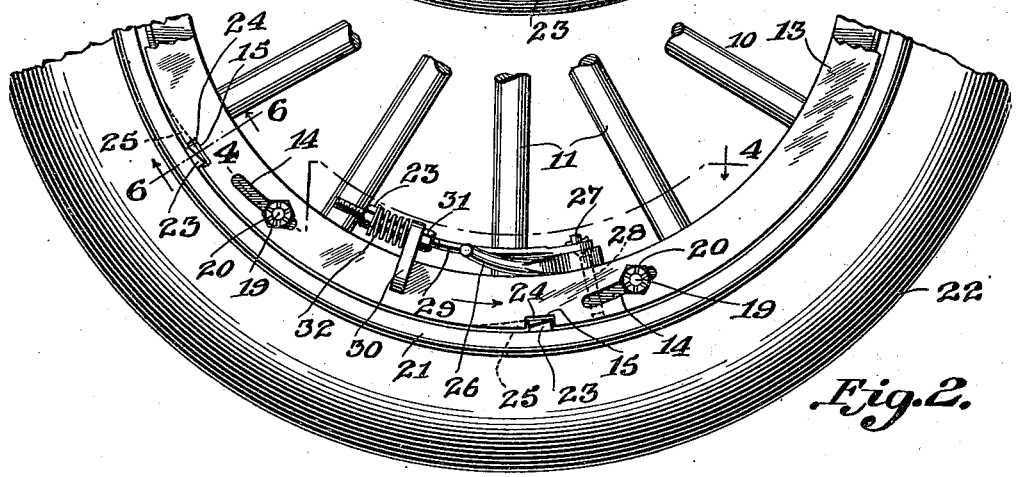
Fig. 2 is an enlarged fragmentary side elevation of the lower portion of the wheel showing the lever in the unlocked position.

Obviously, rotation of the ring in an anti-clockwise direction causes the beveled faces 25 of the ring to move across the beveled under faces 24 of the various lugs upon the rim, and as the wider portions of the ring approach the opposite sides of the lugs, it being noted that the lugs widen transversely as viewed in Figures 2 and 7, there will be a tendency to expand the rim and thus wedge the same in position, at the same time taking up the slack which may have resulted from wear on the rim. By the same operation the ring will be firmly locked in position by the wedging action, which will be assisted by the shifting mechanism now to be described.

In the drawings there is illustrated a preferred form of shifting mechanism for the ring which comprises a lever 26 fulcrumed upon a stud 28 secured in the felly of the wheel and extending inwardly in a radial direction. A link 29 is pivotally connected at one end to a lug 27 upon the lever, and at its other end passes through a lug 30 upon the ring 13. At one side of the lug 30 the link has positioned thereon a nut 31 which abuts the lug, and at the opposite side of the lug receives a spring 32 held in position by a nut 33 threaded upon the end of the link. When the lever 26 is moved to the position shown in Figures 1 and 3 the ring has been shifted so that the lugs 23 are moved out of registry with the recesses 15. In this position the lever 26 has the lug 27 moved past the dead center of the pivotal movement of the lever, and the spring 32, which has been compressed, tends to further move the lever and maintain the lever past its dead center, thereby serving to hold the rim and ring in locked position. It will be noted that the lever is suitably curved at 27' so as to fit around the adjacent spoke of the wheel and be entirely positioned within the two sides of the wheel.

When the lever is moved to the position shown in Figures 2 and 4 the nut 31 will engage the lug 30 upon the ring and bring the lugs 23 in registry with the recesses 15 so that the rim may be removed.

While I have herein shown and described a preferable form of my invention, I would have it understood that changes may be made in the form, proportion and construction of the several parts without departing from the spirit of my invention and within the scope of the appended claims.

I claim:

1. In combination with a wheel having a felly, a locking ring mounted for oscillatory movement on one side of the felly, a plurality of peripheral recesses in said ring, a demountable rim, lugs on the bottom of said rim arranged to register with said recesses, said lugs being provided at their contacting edges with transverse and longitudinally inclined faces adapted to contact with longitudinally inclined faces on said ring, and means on said felly for moving the recesses in and out of registry with said lugs and for bringing into contact said faces.

2. In combination with a wheel having a felly, a locking ring mounted for oscillatory movement on one side of the felly, a plurality of peripheral recesses in said ring, a demountable rim, lugs on the bottom of said rim arranged to register with said recesses, said lugs being provided at their contacting edges with transverse and longitudinally inclined faces adapted to contact with longitudinally inclined faces on said ring, and means on said wheel for moving said ring and causing a binding contact of the lugs with the inner wall of the ring when the recesses are moved out of registry with respect to said lugs.

3. In combination with a wheel having a felly, a rim retaining flange secured to one side of said felly, and a shiftable ring connected to the opposite side thereof, a plurality of peripheral recesses in said ring, a demountable rim provided with lugs adapted to be arranged in or out of registry with said recesses, and a toggle locking lever attached to said wheel for moving the ring with respect to the felly and rim.

4. In combination with a wheel having a felly, a rim retaining flange secured to one side of said felly, and a shiftable ring connected to the opposite side thereof, a plurality of peripheral recesses in said ring, a demountable rim, lugs on the bottom of said rim arranged to register with said recesses, a toggle locking means for oscillating the ring with respect to the rim, said means comprising a lever fulcrumed at one end to the felly, an upwardly extending lug on said ring, and a link connected to said lug, and to said lever.

5. In combination with a wheel having a felly, a rim retaining flange and a shiftable ring secured at opposite sides of the felly, a plurality of peripheral recesses in said ring, a demountable rim, lugs on the bottom of said rim arranged to register with said recesses, a toggle locking means for oscillating the ring with respect to the rim, said means comprising a lever fulcrumed at one end to the felly, a stud on said lever, an upwardly extending lug on said rim, and a link connecting the lever to said stud.

6. In combination with a wheel having a felly, a rim retaining flange and a shiftable ring secured at opposite sides of the felly, a plurality of peripheral recesses in said ring, a demountable rim, lugs on the bottom of said rim arranged to register with said recesses, a toggle locking means for oscillating the ring with respect to the rim, said means comprising a lever fulcrumed at one end to the felly, a stud on said lever, an upwardly extending lug on said ring, a link connecting the lever to said stud, and a resilient member adjustable mounted on the outer end of said link contacting with the lug for maintaining the lever in the locked position.

In testimony whereof I have hereunto set my hand.

JOHN WILLIAM AKARD.